(12) United States Patent
Lebby et al.

(10) Patent No.: US 11,435,604 B2
(45) Date of Patent: Sep. 6, 2022

(54) HYBRID EO POLYMER MODULATOR WITH SILICON PHOTONICS

(71) Applicant: Lightwave Logic Inc., Englewood, CO (US)

(72) Inventors: Michael Lebby, San, CA (US);
Zhiming Liu, Parker, CO (US);
Baoquan Chen, Lone Tree, CO (US)

(73) Assignee: LIGHTWAVE LOGIC INC., Englewood, CO (US)

(*) Notice: Subject to any disclaimer, the term of this patent is extended or adjusted under 35 U.S.C. 154(b) by 25 days.

(21) Appl. No.: 17/121,118

(22) Filed: Dec. 14, 2020

(65) Prior Publication Data

US 2022/0187637 A1 Jun. 16, 2022

(51) Int. Cl.
*G02F 1/065* (2006.01)
*G02F 1/035* (2006.01)

(52) U.S. Cl.
CPC ............ *G02F 1/065* (2013.01); *G02F 1/0356* (2013.01); *G02F 2201/06* (2013.01); *G02F 2202/022* (2013.01)

(58) Field of Classification Search
CPC .... G02F 1/065; G02F 1/0356; G02F 2201/06; G02F 2202/022
See application file for complete search history.

(56) References Cited

U.S. PATENT DOCUMENTS

| | | | | |
|---|---|---|---|---|
| 7,693,355 B2* | 4/2010 | Peyghambarian | ...... | G02F 1/065 385/129 |
| 7,738,745 B2* | 6/2010 | Koenig | ................. | G02F 1/0147 385/2 |
| 7,912,327 B2* | 3/2011 | DeRose | ................. | G02F 1/065 385/129 |

* cited by examiner

*Primary Examiner* — John Bedtelyon
(74) *Attorney, Agent, or Firm* — Parsons & Goltry; Robert A. Parsons; Michael W. Goltry

(57) ABSTRACT

An EO polymer modulator including a substrate with a cladding layer formed on a surface and a passive waveguide core, having a cross-sectional area, formed in the cladding layer and including an elongated tapered active section. An elongated trench in the cladding layer, the elongated tapered active section of the waveguide core positioned in the elongated trench, electrodes positioned on a surface of the cladding layer on opposite sides of the elongated trench, and an elongated strip of EO polymer overlying the elongated tapered active section of the waveguide core. The elongated strip of EO polymer positioned between and parallel with the electrodes and coplanar with the electrodes.

22 Claims, 15 Drawing Sheets

HYBRID EO POLYMER MODULATOR WITH SILICON PHOTONICS

FIELD OF THE INVENTION

This invention relates to the combination of silicon passive waveguides with EO polymer modulators to form active modulation waveguides.

BACKGROUND OF THE INVENTION

In general, prior designs of EO polymer modulators are based on multilayer polymer structures, where every layer of polymer needs to meet a set of processing requirements in order to have the next polymer materials to be able to be put upon the polymer layer beneath. For example, by spin coating of EO polymer solution on to a bottom cladding layer, the bottom cladding layer needs to be able to resist the solvent used for the EO polymer solution. In another example, in order to coat top cladding layer material onto an EO layer, the solvent for the top cladding layer must not dissolve or substantially swell the EO polymer layer. These processing compatibility requirements for each layer substantially complicate the material development.

In general, prior designs of EO polymer modulators require the cladding materials have higher conductivity at poling temperatures so the poling can be efficiently done to the core EO polymer layer in the device stack with cladding layers.

In general, prior designs of EO polymer modulators require each overlying layer can adhere well to a bottom layer. Also, prior designs need to develop the waveguide structure in the polymer stack, which involves etching some of the polymer, requiring fine, precise lithographic process over the thin film polymer layer.

It would be highly advantageous, therefore, to remedy the foregoing and other deficiencies inherent in the prior art.

Accordingly, it is an object of the present invention to provide a new and improved hybrid EO polymer modulator with silicon photonics.

It is another object of the present invention to provide a new and improved hybrid EO polymer modulator with coplanar active layers.

It is another object of the present invention to provide a new and improved hybrid EO polymer modulator with coplanar electrodes.

It is another object of the present invention to provide a new and improved hybrid EO polymer modulator in which the EO polymer can be conveniently poled.

It is another object of the present invention to provide a new and improved hybrid EO polymer modulator that can be easily encapsulated.

SUMMARY OF THE INVENTION

To achieve the desired objects and advantages of the present invention an EO polymer modulator is provided including a substrate with a cladding layer formed on a surface and a passive waveguide core, having a cross-sectional area, formed in the cladding layer and including an elongated tapered active section. An elongated trench in the cladding layer, the elongated tapered active section of the waveguide core positioned in the elongated trench, electrodes positioned on a surface of the cladding layer on opposite sides of the elongated trench, and an elongated strip of EO polymer overlying the elongated tapered active section of the waveguide core. The elongated strip of EO polymer positioned between and parallel with the electrodes and coplanar with the electrodes.

To further achieve the desired objects and advantages of the present invention a specific embodiment of an EO polymer Mach-Zehnder modulator is provided including a substrate with a cladding layer formed on the surface, a passive waveguide core including an input waveguide, and an output waveguide connected at opposite ends to spaced apart parallel legs, each of the legs having a common cross-sectional area, the passive waveguide core formed in the cladding layer and each leg including an elongated tapered active section. Elongated strips of EO polymer, the elongated strips of EO polymer being positioned between and parallel with the electrodes and coplanar with the electrodes. Elongated spaced apart, parallel trenches in the cladding layer and/or in an upper surface of the elongated strips of EO polymer, the elongated tapered active sections of the waveguide core are positioned in the elongated trenches. Electrodes positioned on a surface of the cladding layer on opposite sides of each of the elongated trenches, and the elongated strips of EO polymer overlying each of the elongated tapered active sections of the waveguide core.

To further achieve the desired objects and advantages of the present invention a specific method of fabricating an EO polymer modulator includes the steps of providing a substrate with a cladding layer formed on the surface and forming an elongated trench in the cladding layer. The method further includes the steps of providing a passive waveguide core, having a cross-sectional area, in the cladding layer and including an elongated tapered active section, the elongated tapered active section of the waveguide core positioned in the elongated trench, depositing elongated strips of auxiliary metal on the surface of the cladding layer on opposite sides of the elongated trench, parallel with and spaced from the elongated trench, depositing elongated strips of electrically conductive material on the surface of the cladding layer adjacent to and parallel with outer surfaces of the auxiliary metal elongated strips, depositing a layer of EO polymer material over the elongated trench, the elongated strips of auxiliary metal, and the elongated strips of electrically conductive material, the elongated strips of EO polymer positioned between and parallel with the electrodes and coplanar with the electrodes. The method further includes the steps of applying an electric field across the elongated strips of auxiliary metal while simultaneous heating the structure to a critical temperature to align permanent dipole chromophore molecules in the EO polymer layer, removing a portion of the EO polymer layer overlying the elongated strips of auxiliary metal to expose an upper surface of the elongated strips of auxiliary metal, removing the exposed elongated strips of auxiliary metal to form trenches between the elongated strips of electrically conductive material and the EO polymer material, and depositing a layer of low refractive index material, with a refractive index lower than a refractive index of the EO polymer material, over the elongated strips of electrically conductive material and the EO polymer layer.

BRIEF DESCRIPTION OF THE DRAWINGS

Specific objects and advantages of the invention will become readily apparent to those skilled in the art from the following detailed description of a preferred embodiment thereof, taken in conjunction with the drawings in which.

DETAILED DESCRIPTION OF THE DRAWINGS

Figure 1:
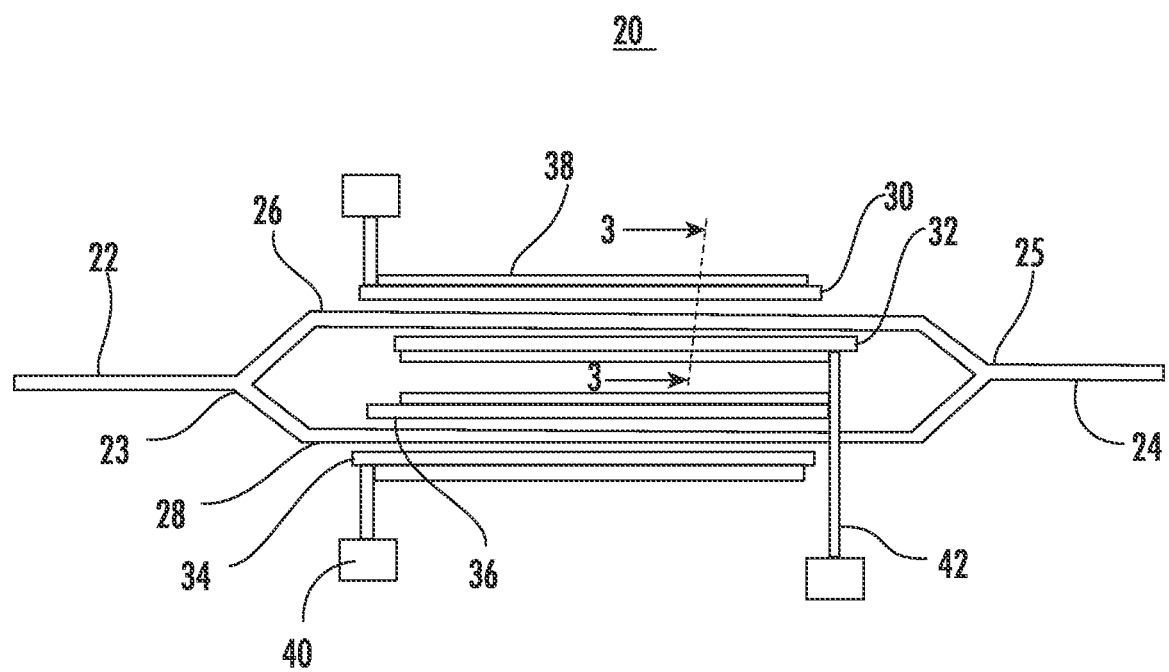
FIG. 1 is a top view of a Mach-Zehnder modulator with co-planar electrodes, in accordance with the present invention.

Referring to FIG. 1, a Mach-Zehnder modulator 20 with co-planar electrodes, in accordance with the present invention, is illustrated. Included with modulator 20 are a light wave input waveguide 22, which is a part of silicon photonic structure, and a light wave output waveguide 24, which is a part of the same or another silicon photonic structure. Some photonic components that can be incorporated in either or both of the input and output photonic structures are, for example, large spot waveguides, mux/demux (multiplies/demultipliers), for example, Echelle gratings, couplers, splitters, etc. Many of these photonic devices are illustrated and explained in a U.S. Pat. No. 10,574,025, entitled "Hermetic Capsule and Method for a Monolithic Photonic Integrated Circuit", issued Feb. 25, 2020, and incorporated herein by reference.

Light wave input waveguide 22 is split at junction 23 into two legs 26 and 28 which are joined again at junction 25 into light wave output waveguide 24. In this specific embodiment one elongated co-planar portion of cladding material 30 is situated adjacent and parallel with the outer surface (upper in FIG. 1) of leg 26 and a second elongated co-planar portion of cladding material 32 is situated adjacent and parallel with the inner surface. Similarly, one elongated co-planar portion of cladding material 34 is situated adjacent and parallel with the outer surface (lower in FIG. 1) of leg 28 and a second elongated co-planar portion of cladding material 36 is situated adjacent and parallel with the inner surface. An elongated co-planar RF electrode 38 is situated adjacent and parallel with the outer surface of cladding material 30. An elongated co-planar RF electrode 40 is situated adjacent and parallel with the outer surface of cladding material 34. A pair of elongated co-planar RF return electrodes 42 are situated adjacent and parallel with the inner surfaces of cladding materials 32 and 36, one each respectively.

Figure 2:
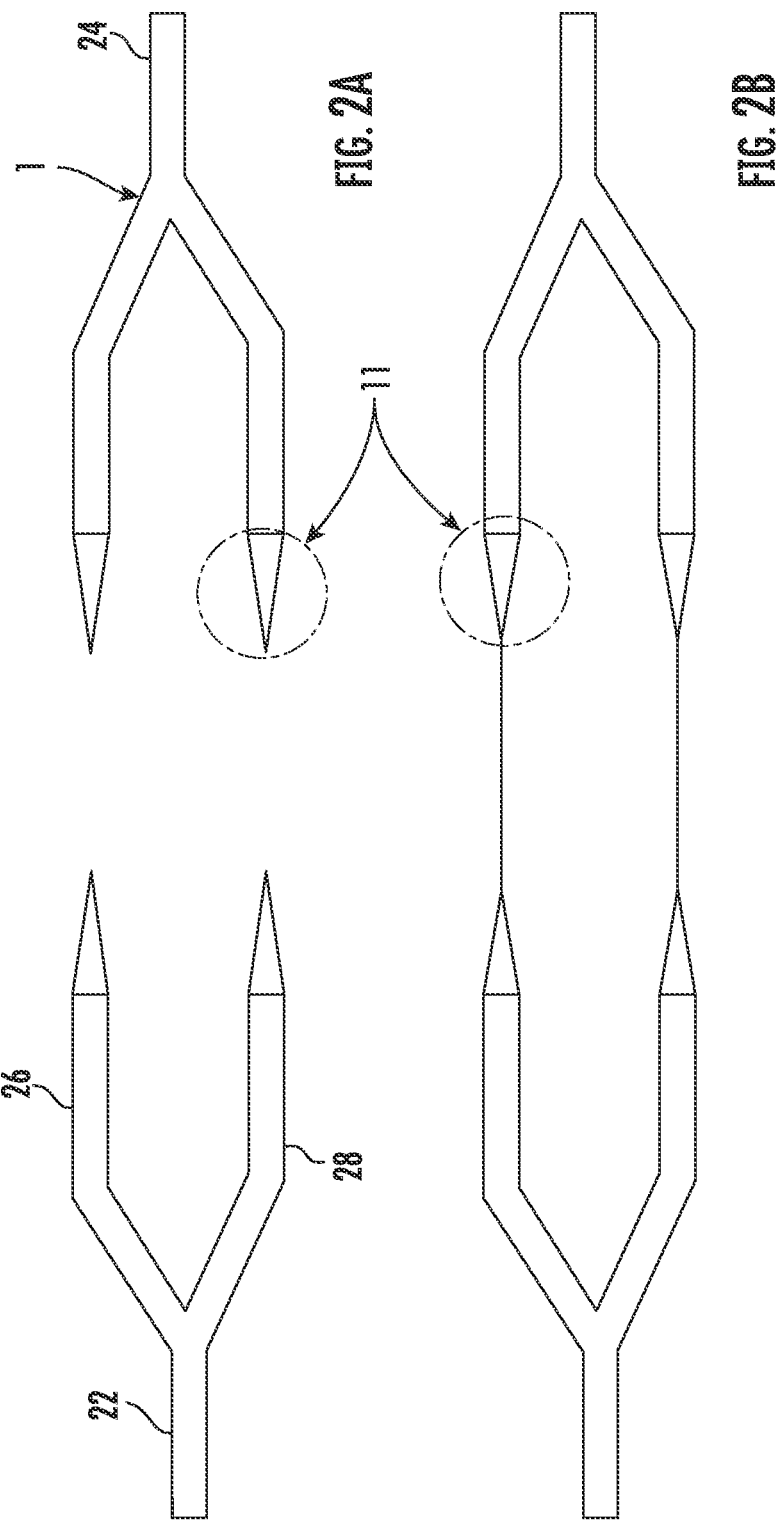
FIG. 2A illustrates one embodiment of a silicon photonics waveguide.
FIG. 2B illustrates another embodiment of a silicon photonics waveguide.

Turning to FIGS. 2A and 2B, two examples of the core structure for input waveguide 22, output waveguide 24, and legs 26 and 28 are illustrated. The core structures can be formed of Si, $Si_3N_4$, $Al_2O_3$, $ZrO_2$, InP, $LiNbO_3$, or doped high refractive index $SiO_2$. In the example illustrated in FIG. 2A, both legs 26 and 28 taper down in cross-sectional dimensions to zero near the input ends and taper back up (increase in size), to the original size or cross-section near the output ends. In the example illustrated in FIG. 2B, both legs 26 and 28 taper down to smaller dimensions, either thinner in height and/or narrower in width and taper back up to the original size or cross-section near the output ends. The reduced size in the mid portion of each of legs 26 and 28, in combination with an adjacent layer of EO polymer, forms an active portion of the waveguide structure that causes light travelling from input waveguide 22 to output waveguide 24 to transition to the adjacent layer of EO polymer. A complete description of the light transition operation is included in a copending U.S. Patent Application entitled "TFP OPTICAL TRANSITION DEVICE AND METHOD", with Ser. No. 17/070,749, filed Oct. 14, 2020 and incorporated herein by reference.

Turning now to FIGS. 3 through 9, steps are illustrated in the fabrication of a Mach-Zehnder modulator in accordance with the present invention. For convenience of understanding and to reduce the complexity of the disclosure, cross-sectional views of only one leg of Mach-Zehnder modulator 20 are illustrated (generally as seen along the line 3-3 in FIG. 1), with the understanding that the opposite leg is as identical as possible.

Figure 3:
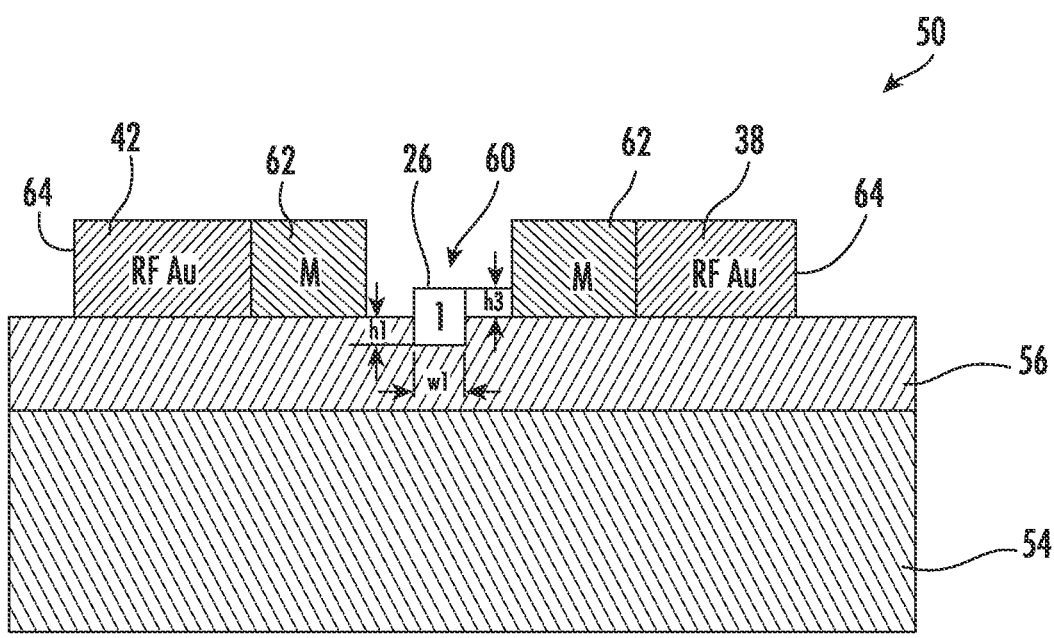
FIG. 3 is a cross-sectional view of portions of the active region of a device material stack fabricated in several initial process steps, in accordance with the present invention.

Referring specifically to FIG. 3 some components of an active region 50 of a device material stack 52 are illustrated. Device material stack 52 is deposited on a substrate 54. Which may be composed of Si or some silicon composition such as $Si_3N_4$. A cladding layer 56 is formed on the surface of substrate 54 and includes material such as $SiO_2$, with a refractive index lower than an EO polymer used in other components of stack 52. A centrally located trench 60 includes leg 26 of Mach-Zehnder modulator 20. At this point in the fabrication process, trench 60 can include air, Si, $Si_3N_4$, InP, $LiNbO_3$, or doped high reflective index $SiO_2$. It will be understood that when trench 60 includes air the embodiment of core structure illustrated in FIG. 2A is included wherein both legs 26 and 28 taper down in cross-sectional dimensions to zero near the input ends and taper back up (increase in size), to the original size near the output ends. When trench 60 includes Si, $Si_3N_4$, InP, $LiNbO_3$, or doped high reflective index $SiO_2$, the embodiment of core structure illustrated in FIG. 2B is included wherein both legs 26 and 28 taper down in cross-sectional dimensions to smaller dimensions, either thinner in height and/or narrower in width, near the input ends and taper back up (increase in size), to the original size near the output ends.

Elongated auxiliary metal poling electrodes 62 are deposited and spaced apart on either side of trench 60. The auxiliary metal may include Ti, Al, Cr, Au, or any combinations thereof. RF electrodes 38 and 42 are deposited on opposite sides of poling electrodes 62. When poling electrodes 62 are formed as independent electrodes an isolation layer 64 is formed to separate RF electrodes 38 and 42 from poling electrodes 62. Isolation layer 64 is optional when poling electrodes 62 are composed of metals other than gold (Au) or when RF electrodes 38 and 42 are used as the poling electrodes in certain designs.

Figure 4:
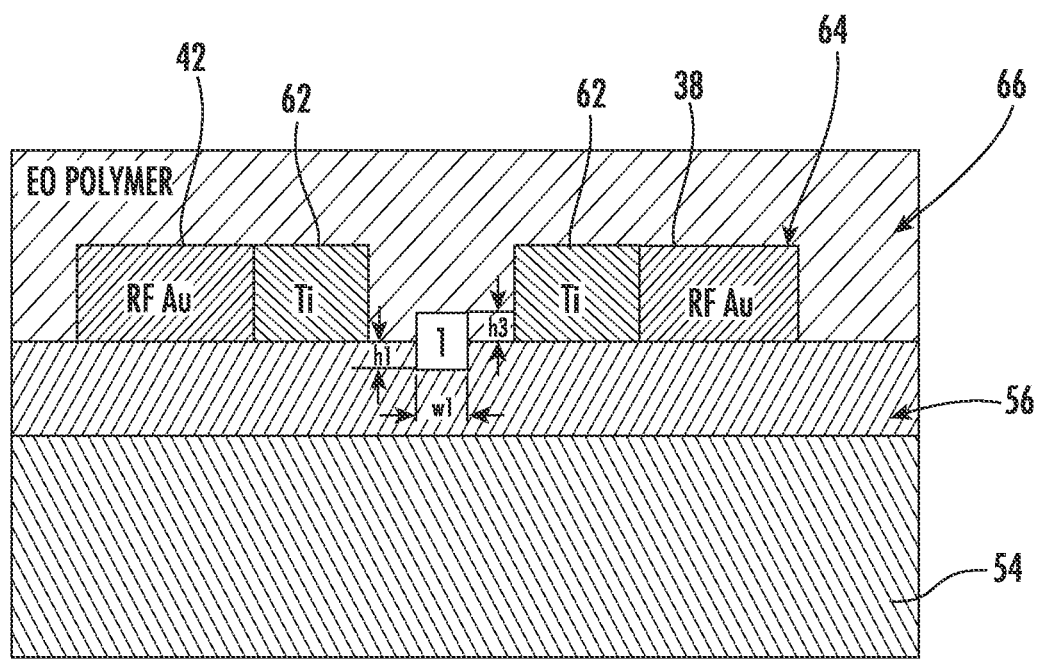
FIG. 4 illustrates the active region of FIG. 3 modified with additional process steps.
Figure 5:
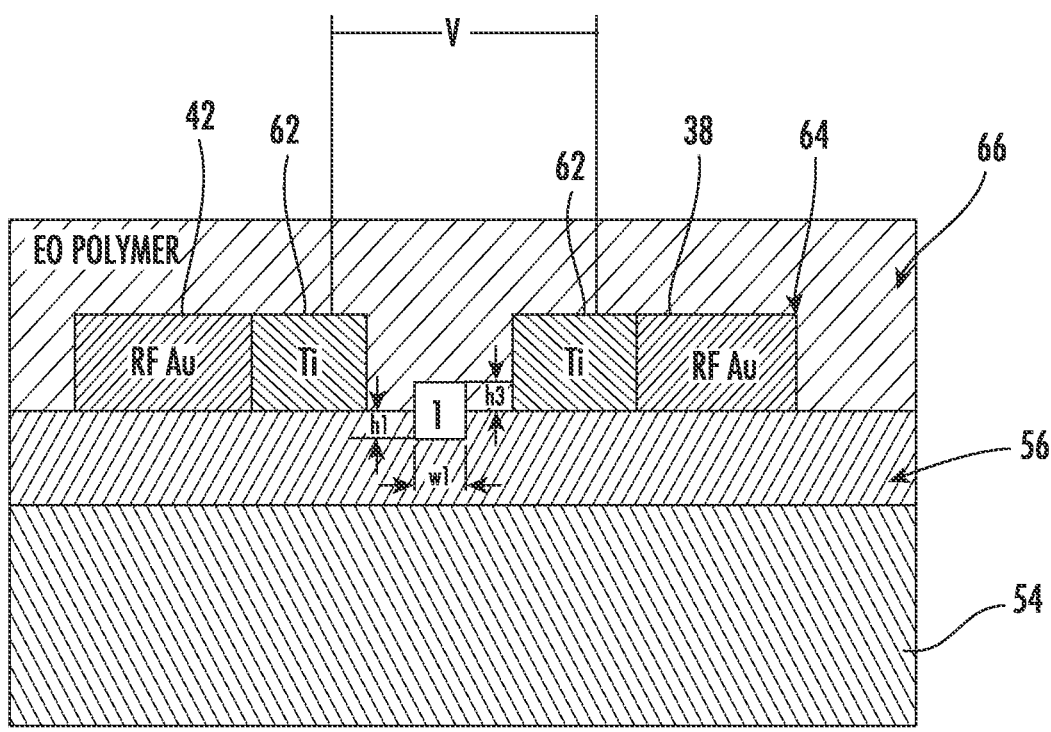
FIG. 5 illustrates additional process steps in the fabrication of a Mach-Zehnder modulator with co-planar electrodes performed on the structure of FIG. 4, including a polymer poling step, in accordance with the present invention.

Referring additionally to FIG. 4, the process illustrated in FIG. 3 continues with a step of depositing a layer 66 of EO polymer. This step can usually be done by spin coating an EO polymer solution followed with drying, for example with a combination of soft bake, hard bake, and a vacuum bake. Referring additionally to FIG. 5, an electric field is applied across poling electrodes 62 while simultaneous heating the structure (at least layer 66 of EO polymer) to a certain temperature to align (or pole) the permanent dipole chromophore molecules and then cooling layer 66 of EO polymer to a lower temperature to keep the aligned chromophore molecules in an ordered state. As is understood in the art, poling consist of heating the polymer to a temperature near or at the glass transition temperature (Tg) of the material and applying an electric field to align the chromophore molecules (or a substantial quantity of them). In this specific embodiment, the electric field is wholly applied over the single EO polymer layer 66 without other cladding layers, so that the poling is controlled better and more predictably.

Figure 6:
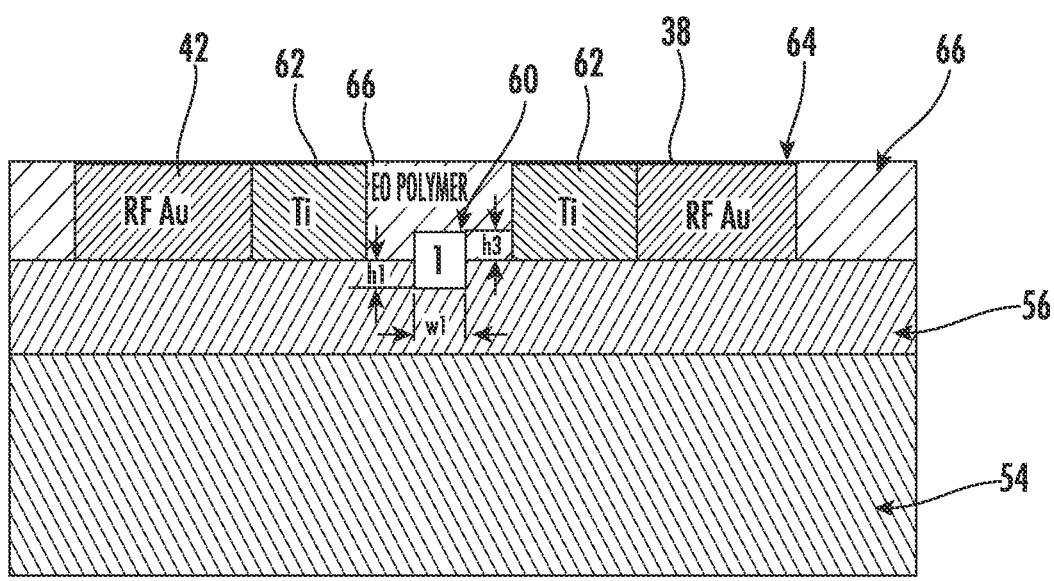
FIG. 6 illustrates additional process steps in the fabrication of a Mach-Zehnder modulator with co-planar electrodes performed on the structure of FIG. 5 in accordance with the present invention.
Figure 7:
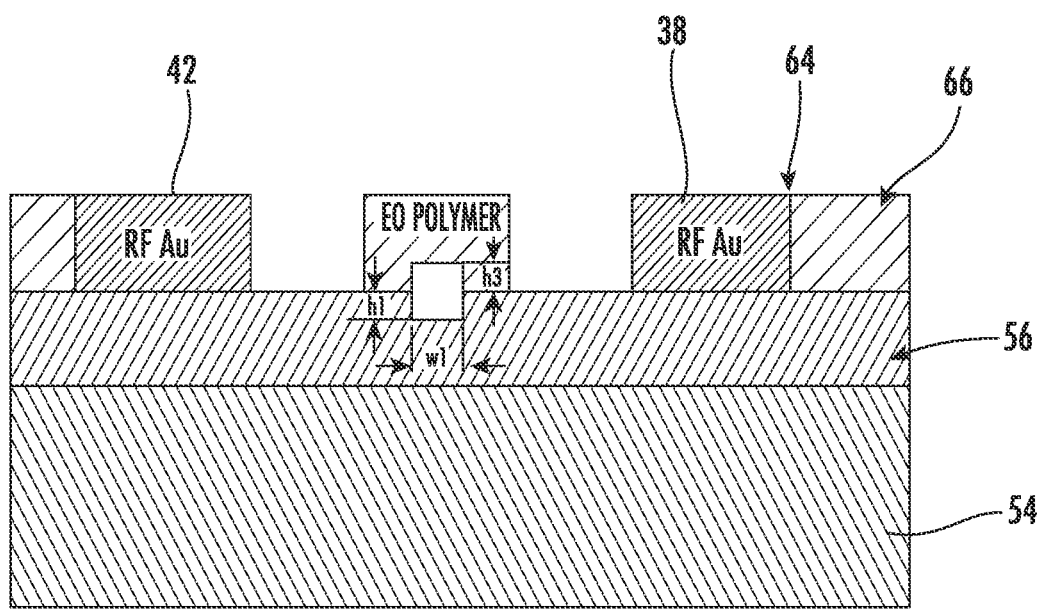
FIG. 7 illustrates additional process steps in the fabrication of a Mach-Zehnder modulator with co-planar electrodes, performed on the structure of FIG. 6 in accordance with the present invention.
Figure 8:
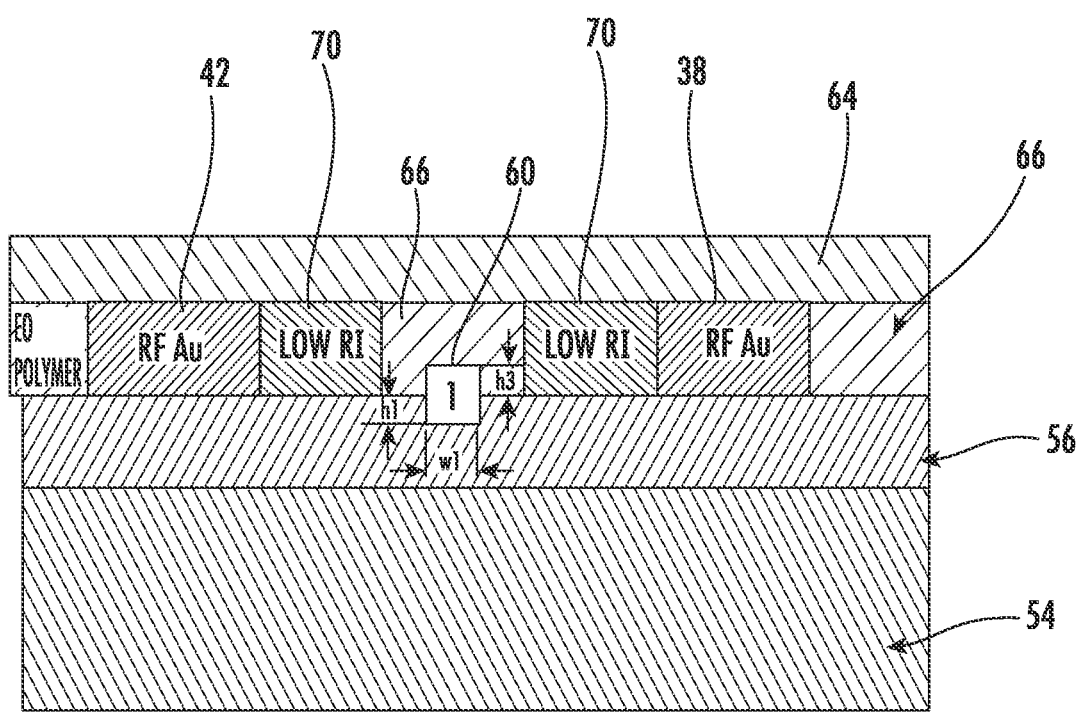
FIG. 8 illustrates additional process steps in the fabrication of a Mach-Zehnder modulator with co-planar electrodes, performed on the structure of FIG. 7 in accordance with the present invention.

Referring now to FIG. 6, EO polymer layer 66 is etched back to expose poling electrodes 62. Poling electrodes 62 can then be selectively etched away, as illustrated in FIG. 7, either by wet or dry etching methods well-known in the art. Here it will be noted that EO polymer layer 66 remains in overlying relationship with trench 60 to complete the active portion of modulator legs 26 and 28. In the embodiments where trench 60 is filled with air, EO polymer layer 66 fills trench 60. Referring additionally to FIG. 8, a low refractive index optical material 70 is deposited, preferably by spin coating or vacuum deposition, over the structure illustrated in FIG. 7 filling the trenches left by the removal of poling electrodes 62. Low refractive index optical material 70 can be for example, but not limited to, $SiO_2$, polymer, UV curable spin-on material, etc. In this step, the deposition temperature, drying, curing, or baking temperatures must be lower than any de-poling temperature of EO polymer layer 66 (see poling temperatures explained above).

Thus, the wave guide cores for Mach-Zehnder modulator 20, legs 26 and 28, are relatively high refractive index silicon surrounded by lower refractive index dielectric material 70, such as $Si_3N_4$, $SiO_x$, etc. and the area between the tapered ends is either EO polymer or the high refractive index material covered with EO polymer. For purposes of understanding and selection, the refractive indices of various materials is as follows; silicon 3.5; $SiO_2$ 1.45; $Si_3N_4$ 2.0; $SiO_x$ 1.45-2.0 (linear in % Ox); EO polymer 1.8 (range 1.4-2.0). As light travelling from input waveguide 22 to output waveguide 24 reaches the missing or narrowed portions of legs 26 and 28, some (FIG. 2B) or all (FIG. 2A) of the light transitions to EO polymer layer 66 and transitions back to the high refractive index silicon core as the active area returns to the normal cross-section or core dimensions. It should be understood that not necessarily all of the light progressing through the waveguide cores transitions into EO polymer layer 66 at the necked-down area (except in the FIG. 2A embodiment) but most of it does. The portions between tapers in legs 26 and 28 is hereinafter referred to as the "active portion" and the remaining waveguide core is referred to as the "passive portion". Thus, the active components and electrodes of active region 50 of device material stack 52 are completed in a novel co-planar arrangement.

Figure 9:
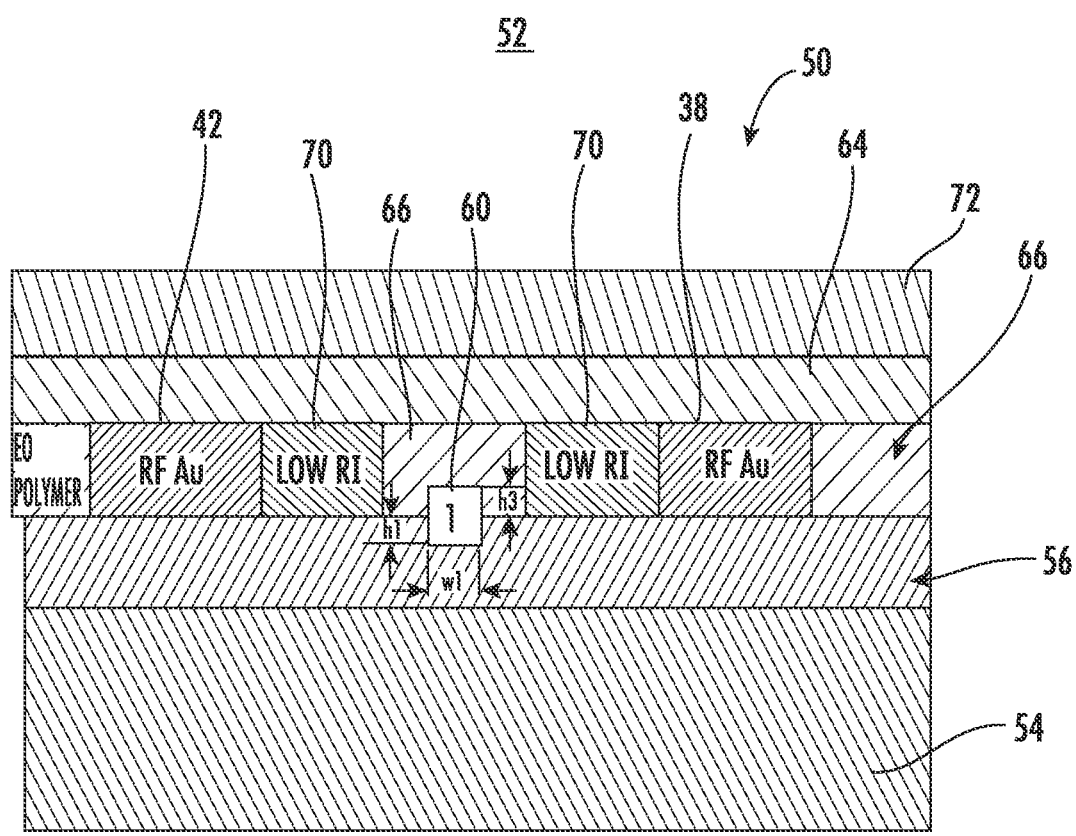
FIG. 9 illustrates additional process steps in the fabrication of a Mach-Zehnder modulator with co-planar electrodes, performed on the structure of FIG. 8 in accordance with the present invention.

Referring to FIG. 9, an encapsulation layer 72 is deposited over the structure illustrated in FIG. 8. Encapsulation layer 72 is an oxygen and water barrier composed of alumina, silica, other metal oxides, or any other material known to hermetically seal optical or electronic components or circuits. Encapsulation layer 72 is preferably deposited using a low temperature deposition method but, in any case, the deposition must be performed at a temperature lower that a temperature that will de-pole EO polymer layer 66. In a preferred example of encapsulation layer 72, aluminum oxide ($Al_xO_y$) is deposited using ALD (atomic layer deposition), which can seal the polymer and chromophores from at least oxygen (this is one example of an atomic species that would be detrimental to the performance of organic polymer devices) to greater than 99%. One of the characteristics of the ALD process is that it is self-limiting in its deposition process and, therefore, is a high quality sealant, which is usually given in terms of low pin-hole levels in the deposited material. In practice, encapsulation layer 72 can include any of the examples: a super lattice design using ALD; combinations of more than one oxide (e.g. 2 oxides or three oxides); combinations of oxide and nitride, or two oxides and one nitride, or two nitrides and one oxide; and use of aluminum oxide and other oxides such as titanium oxide. In any case, the thickness of encapsulation layer 72 should be in a range of 1 nm to 200 nm with a preferred thickness in the range of 50 nm to 200 nm. Thus, in addition to water, moisture, nitrogen, etc. a modulator is designed that is pretty much hermetically sealed from both nitrogen and oxygen by using ALD deposition of $Al_xO_y$. It will be understood that because of the novel design of Mach-Zehnder modulator 20, including the co-planar electrodes and other active components, the structure can be easily encapsulated for oxygen and water protection.

Figure 10:
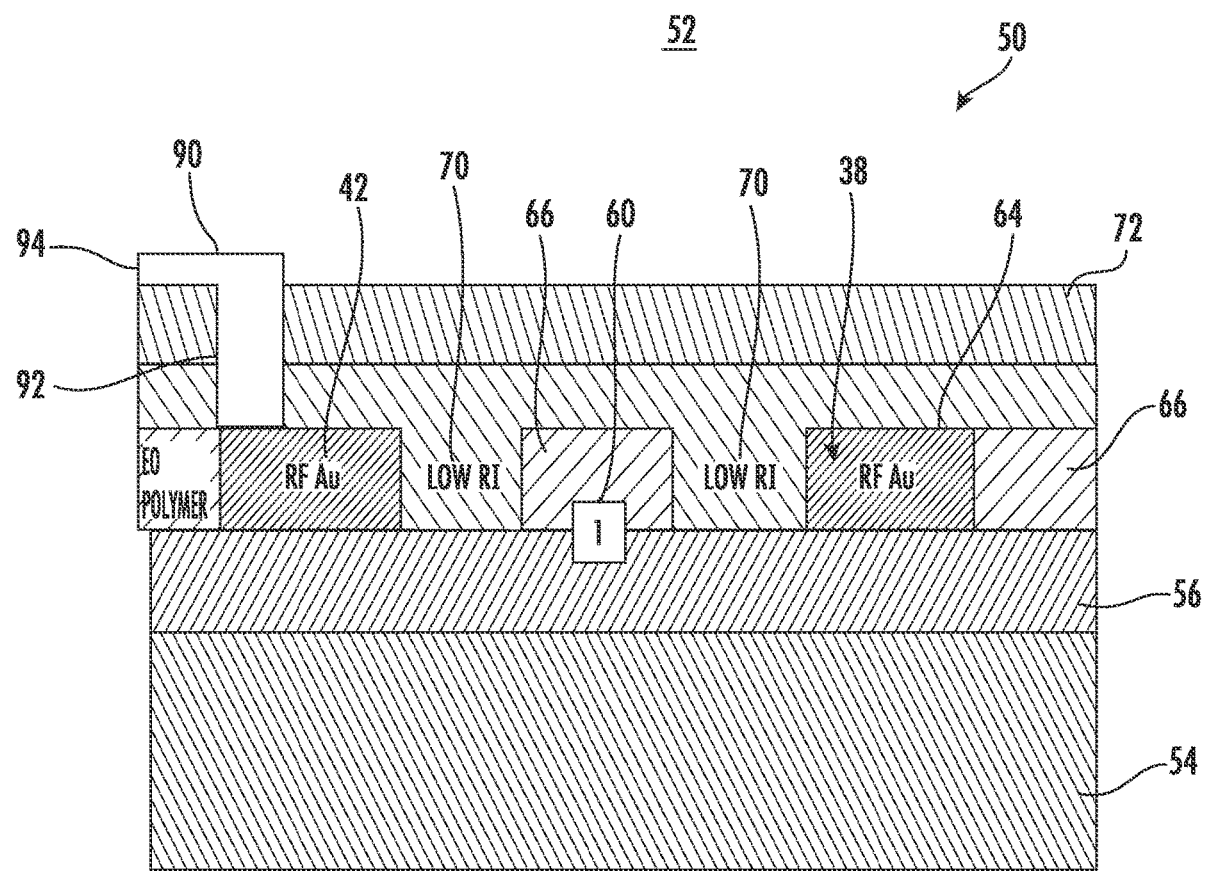
FIG. 10 illustrates a modification of FIG. 9 with metallic interconnect providing for electrically accessing Mach-Zehnder modulator 20 from one side.
Figure 11:
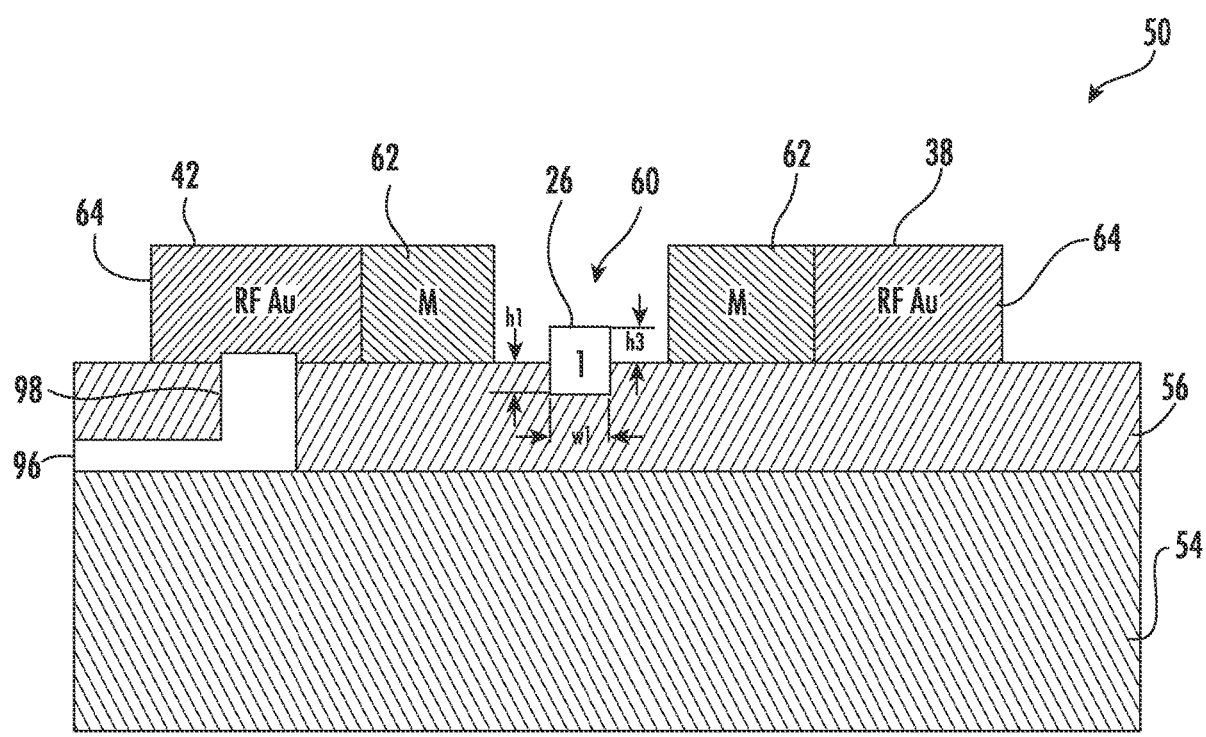
FIG. 11 illustrates another example of metallic interconnect providing for electrically accessing Mach-Zehnder modulator 20 from one side.
Figure 12:
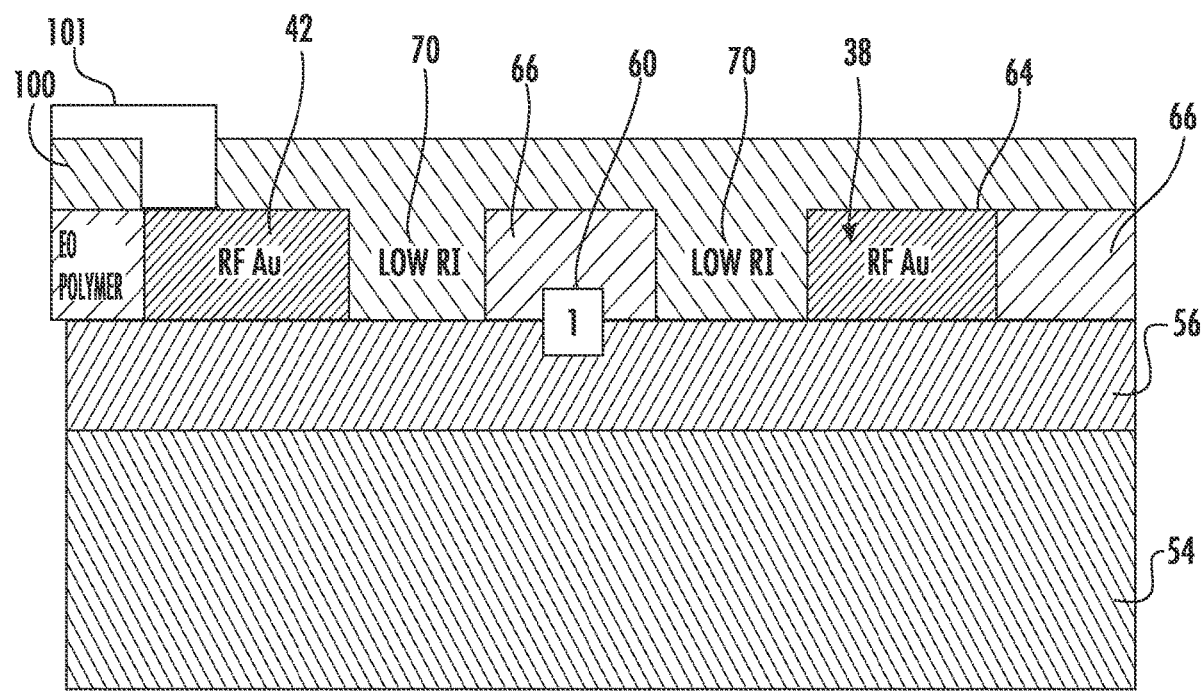
FIG. 12 illustrates another example of metallic interconnect providing for electrically accessing Mach-Zehnder modulator 20 from one side.

Briefly referring to FIG. 1, it can be seen that RF return electrode 42 crosses over one leg of modulator 20 (EO polymer material 66) for electrical access from one side. However, electrode 42 and EO polymer material 66 are coplanar. FIGS. 10, 11, and 12 illustrate different solutions to this problem. Referring specifically to FIG. 10, the structure of FIG. 9 is illustrated with the addition of electrically conductive material (e.g. metal etc.) 90 deposited in a villa 92 through encapsulation layer 72 and low refractive index dielectric material 70 and in contact with RF return electrode 42. Electrically conductive material 90 forms an interconnect or lead on the surface of encapsulation layer 72 that extends to the side of device material stack 52 for external electrical contact.

Referring specifically to FIG. 11 a modification is illustrated in which a side electrical lead 96 is first deposited on the surface of substrate 54, bottom cladding layer 56 is deposited on substrate 54 over lead 96 and a via 98 is formed through bottom cladding layer 56. Via 98 is filled with electrically conductive material in contact with lead 96 and to provide an electrical contact at the surface of bottom cladding layer 56. RF return electrode 42 is then deposited on the surface of bottom cladding layer 56 in contact with the upper end of via 98.

Referring specifically to FIG. 12 a modification is illustrated in which a via 100 is formed through low refractive index dielectric material 70 and filled with electrically conductive material in contact with the surface of RF return electrode 42. An electric lead 101 is deposited on top of dielectric material 70 in contact with the conductive material in via 100 and extends to the side of the structure. All three of the above examples are simply some of the possibilities for providing electrical access to Mach-Zehnder modulator 20 from one side and it will be understood that many other examples are possible, as well as different methods than those described for fabricating the examples illustrated.

Figure 13:
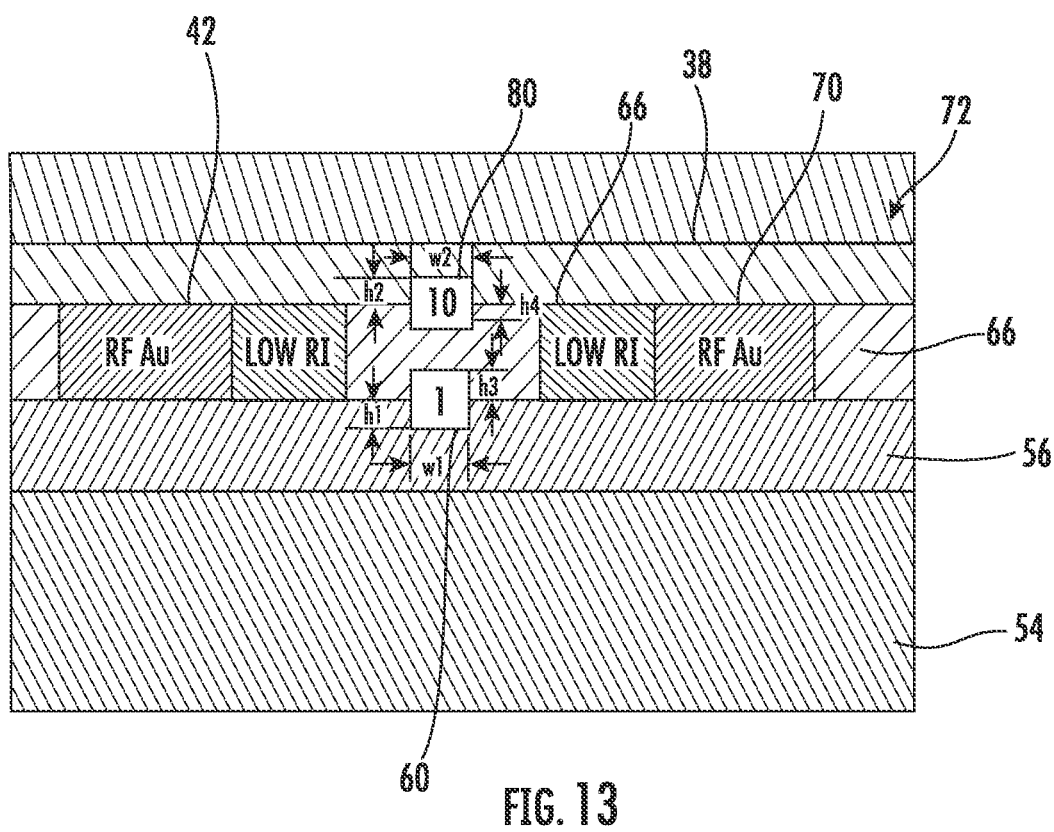
FIG. 13 illustrates a modification of the structure illustrated in FIG. 9, in accordance with the present invention.

Turning to FIG. 13, a modification of the structure illustrated in FIG. 9 is illustrated. In this structure an alternative or second trench 80 is formed in EO polymer layer 66 above or on the opposite side of trench 60. One purpose of this illustration is to show that the trench for the active portion of legs 26 and 28 can be formed above or below the EO polymer. Also, in some specific applications both trenches 60 and 80 may be present to form a cross-shaped waveguide.

Figure 14:
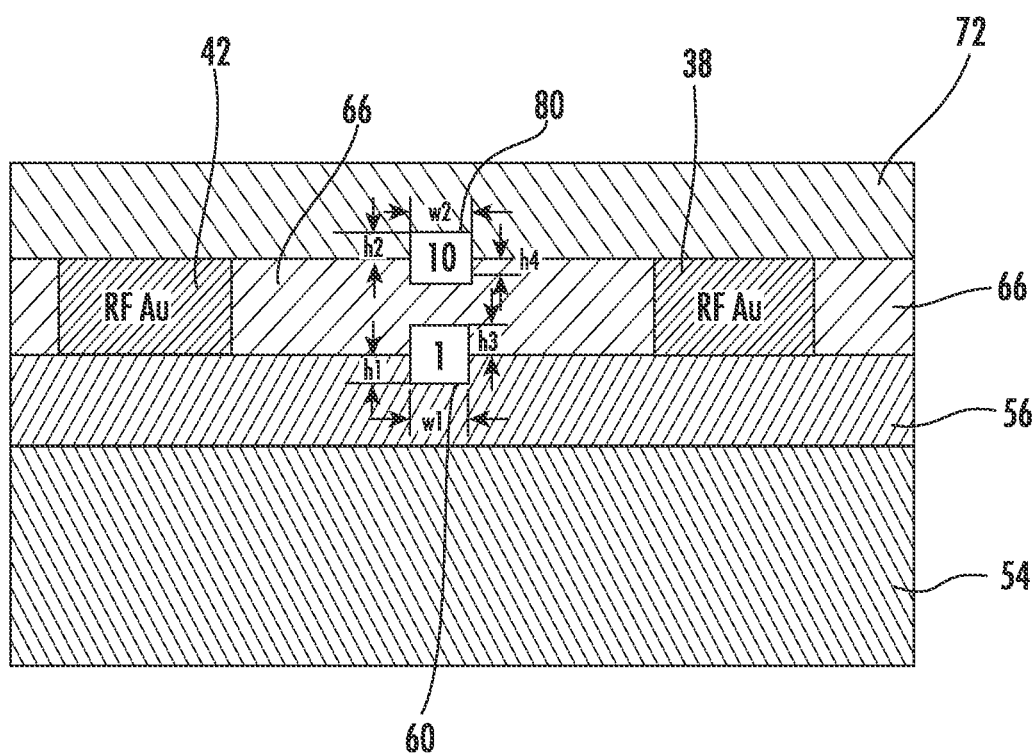
FIG. 14 illustrates another modification of the structure illustrated in FIG. 9, in accordance with the present invention.

Turning to FIG. 14, another possible modification of active region 50 of device material stack 52 is illustrated. In this modification, low refractive index material 70 is eliminated and EO polymer material 66 is deposited in the entire area between electrodes 38 and 42. All of this material is poled (chromophore molecules aligned) as described in conjunction with FIG. 5 so that all of the EO polymer material is a part of the active portion of the device material stack illustrated in FIG. 11. In this embodiment, lower trench 60 and/or upper trench 80 is included in EO polymer layer 66.

Figure 15:
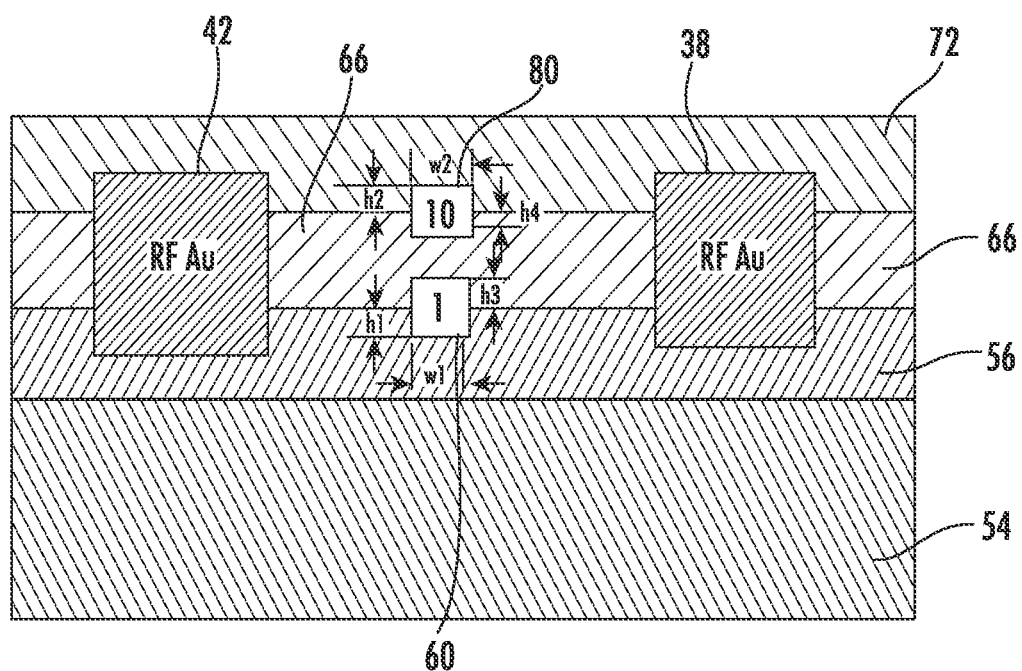
FIG. 15 illustrates another modification of the structure illustrated in FIG. 9, in accordance with the present invention.

Turning to FIG. 15, another possible modification of active region 50 of device material stack 52 is illustrated. In this modification, in order to form high bandwidth RF electrodes, electrodes 38 and 42 can be extended into bottom cladding layer 56 and/or raised above EO polymer layer 66 into encapsulation layer 72. In the case of extending RF electrodes 38 and 42 into bottom cladding layer 56, it is simply a mask and etch process to form trenches into which the metal of RF electrodes 38 and 42 can be deposited. In the case of raising RF electrodes 38 and 42 above EO polymer layer 66 it is simply a process of depositing a layer of the metal forming RF electrodes 38 and 42 and patterning the layer to define electrodes 38 and 42. In either case the electrodes and EO polymer are still considered to be coplanar since they lie in a common plane.

Thus, a new and improved hybrid EO polymer modulator with silicon photonics has been disclosed. The new and improved hybrid EO polymer modulator includes coplanar active layers and coplanar electrodes. Also, the novel design allows the EO polymer to be conveniently poled and easily encapsulated. Because of the coplanar design complicated deposition of successive layers of cladding and EO polymers are not required. Also, since the active layers are co-planar, adhesive issues for successive layers are not a problem. Further, in the present design, poling voltage is applied to a single EO polymer layer without cladding so that the polling process is not restricted by cladding conductivity. In the present novel design, the critical structure is done on silicon by a state-of-the art CMOS process and the polymer waveguide structure formation does not require a very precise lithographic process over thin film polymer layers.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An EO polymer modulator comprising:
    a substrate with a cladding layer formed on a surface;
    a passive waveguide core, having a cross-sectional area, formed in the cladding layer and including an elongated tapered active section;
    an elongated trench in the cladding layer, the elongated tapered active section of the waveguide core positioned in the elongated trench;
    electrodes positioned on a surface of the cladding layer on opposite sides of the elongated trench; and
    an elongated strip of EO polymer overlying the elongated tapered active section of the waveguide core, the elongated strip of EO polymer positioned between and parallel with the electrodes and coplanar with the electrodes.

2. The EO polymer modulator as claimed in claim 1 wherein the elongated tapered active section of the waveguide core includes a portion that tapers from the cross-sectional area to zero and a spaced apart portion that expands from zero to the cross-sectional area.

3. The EO polymer modulator as claimed in claim 2 wherein the portion of the elongated trench where the waveguide core tapers to zero is filled with a portion of the elongated strip of EO polymer.

4. The EO polymer modulator as claimed in claim 1 wherein the elongated tapered active section of the waveguide core includes a portion that tapers from the cross-sectional area to a smaller dimension and a spaced apart portion that expands from the smaller dimension to the cross-sectional area.

5. The EO polymer modulator as claimed in claim 1 wherein the electrodes include a pair of spaced apart RF electrodes.

6. The EO polymer modulator as claimed in claim 5 wherein the RF electrodes are high bandwidth electrodes and extend into the surface of the cladding layer and/or above the surface of the elongated strip of EO polymer.

7. The EO polymer modulator as claimed in claim 5 wherein the electrodes include a pair of spaced apart poling electrodes, the poling electrodes being positioned between the RF electrodes and adjacent opposite sides of the elongated trench.

8. The EO polymer modulator as claimed in claim 1 wherein elongated strips of low refractive index material are positioned between the electrodes and adjacent opposite sides of the elongated strip of EO polymer, the low refractive index material having a refractive index lower than a refractive index of the EO polymer material.

9. The EO polymer modulator as claimed in claim 1 further including an encapsulation layer covering at least the electrodes positioned on a surface of the cladding layer and the elongated strip of EO polymer.

10. The EO polymer modulator as claimed in claim 1 wherein the elongated strips of low refractive index material include $SiO_2$.

11. The EO polymer modulator as claimed in claim 1 wherein the modulator is a Mach-Zehnder modulator and the passive waveguide core includes a pair of spaced apart legs with each leg having a cross-sectional area, and each leg including an elongated tapered active section.

12. An EO polymer Mach-Zehnder modulator comprising:
a substrate with a cladding layer formed on the surface;
a passive waveguide core including an input waveguide, and an output waveguide connected at opposite ends to spaced apart parallel legs, each of the legs having a common cross-sectional area, the passive waveguide core formed in the cladding layer and each leg including an elongated tapered active section;
elongated strips of EO polymer, the elongated strips of EO polymer positioned between and parallel with the electrodes and coplanar with the electrodes;
elongated spaced apart, parallel trenches in the cladding layer and/or in an upper surface of the elongated strips of EO polymer, the elongated tapered active sections of the waveguide core positioned in the elongated trenches;
electrodes positioned on a surface of the cladding layer on opposite sides of each of the elongated trenches; and
the elongated strips of EO polymer overlying each of the elongated tapered active sections of the waveguide core.

13. The EO polymer Mach-Zehnder modulator as claimed in claim 12 wherein the elongated tapered active section of the waveguide core includes a portion that tapers from the cross-sectional area to zero and a spaced apart portion that expands from zero to the cross-sectional area.

14. The EO polymer Mach-Zehnder modulator as claimed in claim 13 wherein the portion of the elongated trench where the waveguide core tapers to zero is filled with a portion of the elongated strip of EO polymer.

15. The EO polymer Mach-Zehnder modulator as claimed in claim 12 wherein the elongated tapered active section of the waveguide core includes a portion that tapers from the cross-sectional area to a smaller dimension and a spaced apart portion that expands from the smaller dimension to the cross-sectional area.

16. The EO polymer Mach-Zehnder modulator as claimed in claim 12 wherein the electrodes include a pair of spaced apart RF electrodes.

17. A method of fabricating an EO polymer modulator comprising the steps of:
providing a substrate with a cladding layer formed on the surface;
forming an elongated trench in the cladding layer;
providing a passive waveguide core, having a cross-sectional area, in the cladding layer and including an elongated tapered active section, the elongated tapered active section of the waveguide core positioned in the elongated trench;
depositing elongated strips of auxiliary metal on the surface of the cladding layer on opposite sides of the elongated trench, parallel with and spaced from the elongated trench;
depositing elongated strips of electrically conductive material on the surface of the cladding layer adjacent to and parallel with outer surfaces of the auxiliary metal elongated strips;
depositing a layer of EO polymer material over the elongated trench, the elongated strips of auxiliary metal, and the elongated strips of electrically conductive material, the elongated strips of EO polymer positioned between and parallel with the electrodes and coplanar with the electrodes;
applying an electric field across the elongated strips of auxiliary metal while simultaneous heating the structure to a critical temperature to align permanent dipole chromophore molecules in the EO layer;
removing a portion of the EO polymer layer overlying the elongated strips of auxiliary metal to expose an upper surface of the elongated strips of auxiliary metal;
removing the exposed elongated strips of auxiliary metal to form trenches between the elongated strips of electrically conductive material and the EO polymer material;
depositing a layer of low refractive index material, with a refractive index lower than a refractive index of the EO polymer material, over the elongated strips of electrically conductive material and the EO polymer layer.

18. The method as claimed in claim 17 including a step of depositing encapsulation material over the layer of low refractive index material.

19. The method as claimed in claim 18 wherein the step of depositing encapsulation material includes depositing aluminum oxide (AlxOy) using ALD (atomic layer deposition).

20. The method as claimed in claim 17 wherein the step of providing a passive waveguide core includes providing the elongated tapered active section of the waveguide core with a portion that tapers from the cross-sectional area to zero and a spaced apart portion that expands from zero to the cross-sectional area.

21. The method as claimed in claim 20 wherein the portion of the elongated trench where the waveguide core tapers to zero is filled with a portion of the elongated strip of EO polymer.

22. The method as claimed in claim 17 wherein the step of providing the elongated tapered active section of the waveguide core includes a portion that tapers from the cross-sectional area to a smaller dimension and a spaced apart portion that expands from the smaller dimension to the cross-sectional area.

* * * * *